United States Patent
Yoshida

(10) Patent No.: US 10,046,271 B2
(45) Date of Patent: Aug. 14, 2018

(54) AIR CLEANER FOR FUEL CELL SYSTEM

(71) Applicant: TOYOTA BOSHOKU KABUSHIKI KAISHA, Aichi-ken (JP)

(72) Inventor: Kimiko Yoshida, Nagoya (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/684,232

(22) Filed: Aug. 23, 2017

(65) Prior Publication Data

US 2018/0056237 A1 Mar. 1, 2018

(30) Foreign Application Priority Data

Aug. 29, 2016 (JP) .................................. 2016-167239

(51) Int. Cl.
| | |
|---|---|
| *F01N 3/10* | (2006.01) |
| *B01D 53/50* | (2006.01) |
| *B01D 39/16* | (2006.01) |
| *B01D 46/00* | (2006.01) |
| *B01D 46/52* | (2006.01) |
| *H01M 8/04082* | (2016.01) |

(52) U.S. Cl.
CPC ........... *B01D 53/50* (2013.01); *B01D 39/163* (2013.01); *B01D 46/0032* (2013.01); *B01D 46/0036* (2013.01); *B01D 46/521* (2013.01); *H01M 8/04201* (2013.01)

(58) Field of Classification Search
CPC ................ B01D 46/10; B01D 46/0415; B01D 2258/98; B01D 2267/40
USPC ................................ 422/168, 171, 177, 180
See application file for complete search history.

(56) References Cited

U.S. PATENT DOCUMENTS

| | | | | |
|---|---|---|---|---|
| 2005/0042151 A1* | 2/2005 | Alward | .............. | B01D 39/2082 422/177 |
| 2005/0235615 A1* | 10/2005 | Nyman | .............. | B01D 46/0023 55/350.1 |

FOREIGN PATENT DOCUMENTS

| | | |
|---|---|---|
| JP | 2008-52969 | 3/2008 |
| JP | 2012086183 A * | 5/2012 |

* cited by examiner

*Primary Examiner* — Tom P Duong
(74) *Attorney, Agent, or Firm* — Greenblum & Bernstein, P.L.C.

(57) ABSTRACT

An air cleaner for a fuel cell system includes a housing, a first filter, and a second filter. The first filter is arranged inside the housing and collects dust contained in air. The second filter is arranged side by side with the first filter in an air flowing direction inside the housing and adsorbs impure gas contained in air. The first filter includes a filtering member, which has nonwoven fabric and filter paper adhered to the nonwoven fabric. The filter paper is located on a downstream side in the air flowing direction of the nonwoven fabric and has a higher packing density than the nonwoven fabric. The second filter includes a base member having a honeycomb structure with through-holes and adsorbent, which is provided on inner surfaces of the through-holes and adsorbs the impure gas.

5 Claims, 2 Drawing Sheets

AIR CLEANER FOR FUEL CELL SYSTEM

BACKGROUND OF THE INVENTION

The present invention relates to an air cleaner that is employed in a fuel cell system and arranged in a passage for supplying air to a fuel cell main body.

A fuel cell system includes a passage for supplying fuel gas to the fuel cell main body having an electrolyte membrane and a passage for supplying oxidation gas to the fuel cell main body.

For example, in a vehicle equipped with a fuel cell system, that is, in a vehicle that travels with electric power generated by the fuel cell main body as a power source, air outside the vehicle containing oxidation gas is drawn in by a compressor. The drawn-in air is supplied to the fuel cell main body through an air supply passage (see, for example, Japanese Laid-Open Patent Publication No. 2008-52969).

In the air supply passage described in the publication, an air cleaner and the compressor are provided in the order from the upstream side. The air cleaner has in its case an air filter made of filter paper. When the air drawn-in from outside the vehicle passes through the air filter, the dust contained in the air is removed by the air filter.

Air contains impure gases such as sulfur dioxide and hydrogen sulfide. In particular, when such sulfur-based gas flows into the fuel cell main body and is adsorbed by a platinum catalyst or the like, the catalytic function may be degraded so that the battery performance is reduced. In this regard, it has been conventionally proposed to provide an adsorption filter for adsorbing impure gas in the middle of the air supply passage.

Conventional air cleaners for fuel cell systems including the air cleaner described in the publication still have room for improvement in dust removal performance. Also, providing a filter for collecting dust and a filter for adsorbing impure gas in the air supply passage increases the airflow resistance, increasing the pressure loss. Furthermore, providing a filter for collecting dust contained in the air and a filter for adsorbing impure gas complicates the structure of the air supply passage.

SUMMARY OF THE INVENTION

Accordingly, it is an objective of the present invention to provide an air cleaner for a fuel cell system capable of suppressing an increase in pressure loss while improving both the dust collection performance and the impure gas adsorption performance.

To achieve the foregoing objective and in accordance with one aspect of the present invention, an air cleaner for a fuel cell system is provided that is employed in a fuel cell system and arranged in a passage for supplying air to a fuel cell main body. The air cleaner includes a housing having an inlet and an outlet, a first filter, which is arranged inside the housing and collects dust contained in air, and a second filter, which is arranged side by side with the first filter in an air flowing direction inside the housing and adsorbs impure gas contained in air. The first filter includes a filtering member, which has nonwoven fabric and filter paper adhered to the nonwoven fabric. The filter paper is located on a downstream side in the air flowing direction of the nonwoven fabric and has a higher packing density than the nonwoven fabric. The second filter includes a base member having a honeycomb structure with a large number of through-holes, and adsorbent, which is provided on inner surfaces of the through-holes and adsorbs the impure gas.

DETAILED DESCRIPTION OF THE PREFERRED EMBODIMENTS

One embodiment will now be described with reference to FIGS. 1 to 4.

First, with reference to FIG. 1, a schematic configuration of a fuel cell system will be described.

The fuel cell system of the present embodiment is mounted on a vehicle to generate electric power as a drive source for traveling.

Figure 1:
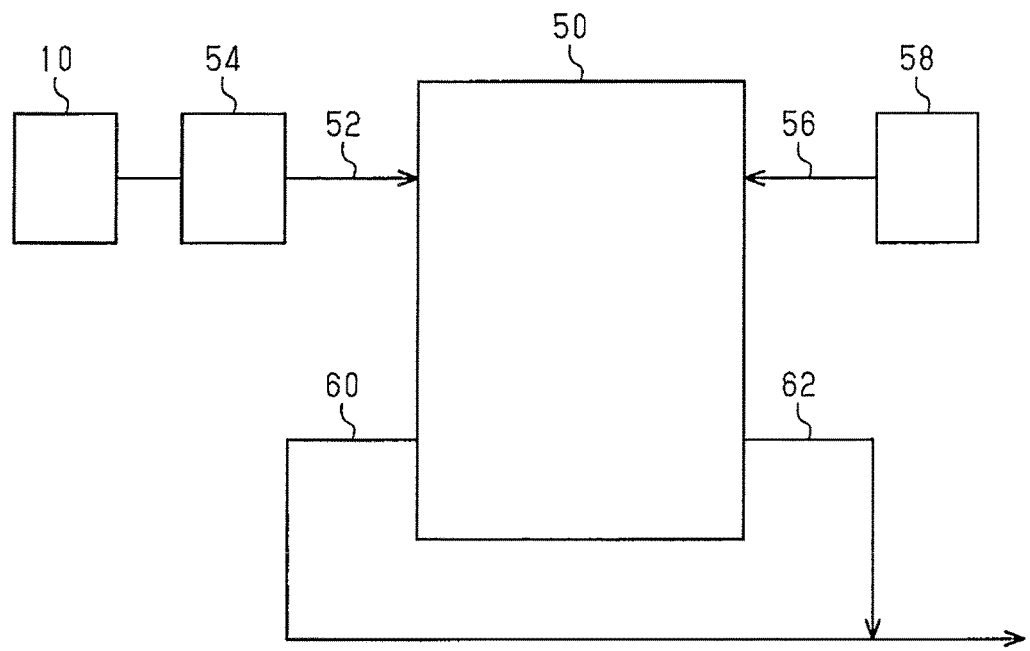
FIG. 1 is a block diagram showing a schematic configuration of a fuel cell system in which an air cleaner for a fuel cell system according to one embodiment is employed.

As shown in FIG. 1, the fuel cell system includes a fuel cell stack 50, an air supply passage 52, and a hydrogen supply passage 56. The fuel cell stack 50 is configured by stacking cells each having an electrolyte membrane. The air supply passage 52 supplies air to the fuel cell stack 50. The hydrogen supply passage 56 supplies hydrogen from a high pressure tank 58 to the fuel cell stack 50. The fuel cell stack 50 of the present embodiment corresponds to a fuel cell main body.

The fuel cell system further includes an air discharge passage 60 for discharging off-gas of air from the fuel cell stack 50 and a hydrogen discharge passage 62 for discharging off-gas of hydrogen from the fuel cell stack 50.

Hereinafter, the upstream side and the downstream side in the air flow direction of the air supply passage 52 are defined as an upstream side and a downstream side.

The air supply passage 52 is provided with an air cleaner 10 and a compressor 54 in the order from the upstream side. The compressor 54 draws in air and delivers it under pressure to the fuel cell stack 50. On the downstream side of the compressor 54, a humidifier (not shown) for humidifying air is provided.

Next, with reference to FIGS. 2 to 4, the air cleaner 10 of the present embodiment will be described.

Figure 2:
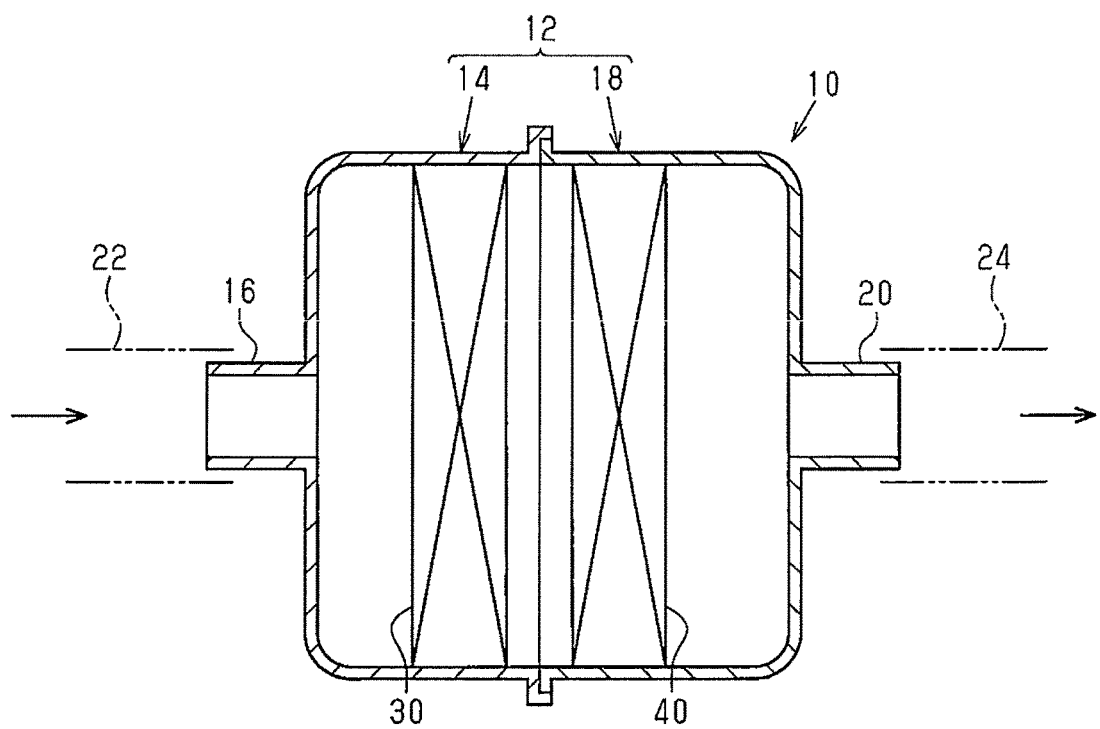
FIG. 2 is a cross-sectional view illustrating the cross-sectional structure of the air cleaner of the embodiment.

As shown in FIG. 2, the air cleaner 10 includes a housing 12. The housing 12 includes a case 14 having an inlet 16 and a cap 18 having an outlet 20.

An inlet duct 22 is connected to the inlet 16. The inlet duct 22 may be omitted.

A connection duct 24 is connected to the outlet 20. The compressor 54 is connected to the downstream side of the connection duct 24.

The housing 12 accommodates a first filter 30 and a second filter 40 in the order from the upstream side. The first filter 30 collects dust contained in air and the second filter 40 adsorbs impure gas such as sulfur-based gas (for example, sulfur dioxide or hydrogen sulfide) contained in air. The first filter 30 and the second filter 40 are each provided over the entire cross section of the flow path of the housing 12.

The first filter 30 will now be described.

Figure 3:
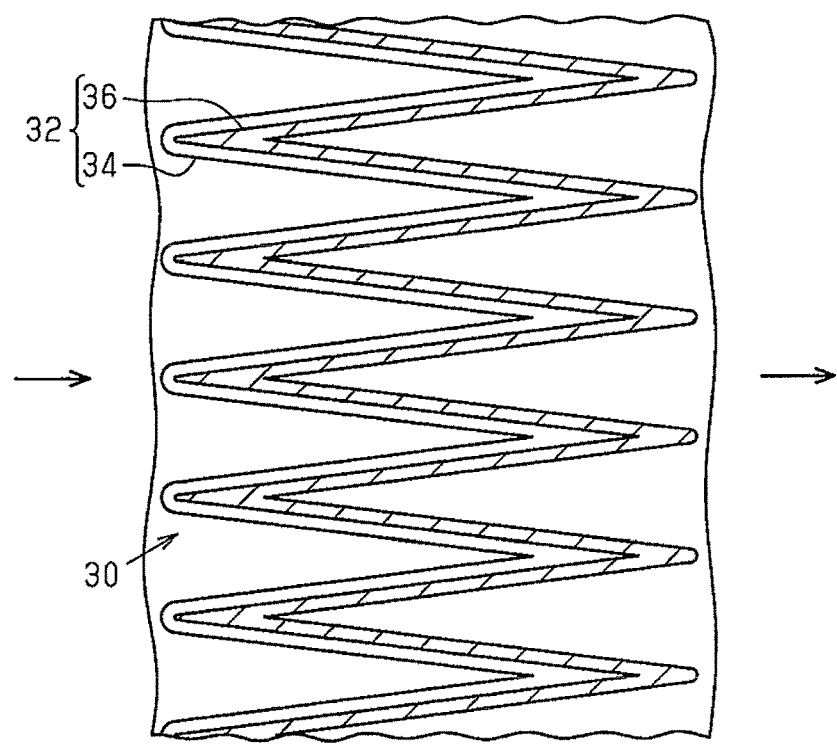
FIG. 3 is a cross-sectional view showing the cross-sectional structure along a flowing direction of air in part of a filtering member of a first filter of the embodiment.
Figure 4:
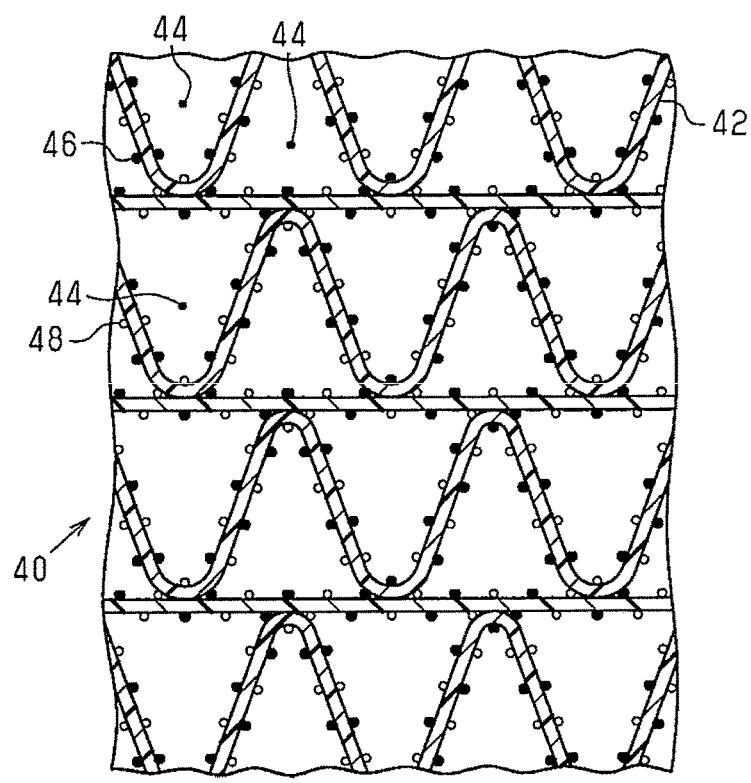
FIG. 4 is a cross-sectional view showing the cross-sectional structure perpendicular to the flowing direction of air in part of a second filter of the embodiment.

As shown enlarged in FIG. 3, the first filter 30 has a pleated filtering member 32. A sealing member (not shown) for sealing the gap between the filtering member 32 and the housing 12 is provided on the outer periphery of the filtering member 32.

The filtering member 32 is formed by nonwoven fabric 34 and filter paper 36 adhered to the nonwoven fabric 34. The filter paper 36 is located on the downstream side of the nonwoven fabric 34 and has a higher packing density than the nonwoven fabric 34. The nonwoven fabric 34 is made of, for example, a plastic fiber such as polypropylene. The nonwoven fabric 34 of the present embodiment is electret nonwoven fabric that has been subjected to a charging process. In the present embodiment, the nonwoven fabric 34 and the filter paper 36 are partially thermocompression bonded to each other by embossing using ultrasonic vibration.

The second filter 40 will now be described.

As shown enlarged in FIG. 4, the second filter 40 includes a base member having a honeycomb structure (hereinafter, referred to as a honeycomb base member 42) having a large number of through-holes 44. The honeycomb base member 42 is formed of aluminum foil. A sealing member (not shown) for sealing the gap between the honeycomb base member 42 and the housing 12 is provided on the outer periphery of the honeycomb base member 42.

The "honeycomb structure" is not limited to a narrow sense of a honeycomb structure, in which through-holes having a regular hexagonal cross section are arranged with partition walls in between without gaps, but also includes a honeycomb structure in a broad sense, in which through-holes having a predetermined cross-sectional shape are arranged with partition walls in between without gaps.

Powdery oxidation catalyst 46 for oxidizing sulfur-based gas such as sulfur dioxide and hydrogen sulfide contained in air and powdery adsorbent 48 for adsorbing sulfur oxide are applied to the inner surfaces of the through-holes 44. FIG. 4 schematically illustrates the oxidation catalyst 46 and the adsorbent 48. As the oxidation catalyst 46, manganese dioxide is preferable. As the adsorbent 48, activated carbon is preferable.

The operation of the present embodiment will now be described.

When the air drawn in by the compressor 54 passes through the filtering member 32 of the first filter 30, relatively large particles of dust and the like contained in the air are collected by the nonwoven fabric 34. Small particles of dust and the like that have passed through the nonwoven fabric 34 are collected by the filter paper 36 adhered to the downstream side of the nonwoven fabric 34. Therefore, it is possible to collect particles of dust of a wide range of sizes.

When air passes through the through-holes 44 of the honeycomb base member 42 of the second filter 40, sulfur-based gas such as sulfur dioxide and hydrogen sulfide contained in the air is oxidized by the oxidation catalyst 46, and sulfuric acid and the like thus generated are adsorbed by the adsorbent 48.

Since the honeycomb base member 42 has a large number of through-holes 44, it is possible to limit an increase in pressure loss while maintaining the adsorption performance for sulfur-based gas.

The air cleaner for a fuel cell system according to the above-described embodiment has the following advantages.

(1) The first filter 30 includes the filtering member 32. The filtering member 32 includes the nonwoven fabric 34 and the filter paper 36 adhered to the nonwoven fabric 34. The filter paper 36 is located on the downstream side in the air flowing direction of the nonwoven fabric 34 and has a higher packing density than the nonwoven fabric 34. The second filter 40 has the honeycomb base member 42 having a large number of through-holes 44, the oxidation catalyst 46, and the adsorbent 48. The oxidation catalyst 46 and the adsorbent 48 are provided on the inner surface of each through-hole 44. The oxidation catalyst 46 oxidizes sulfur-based gas contained in air. The adsorbent 48 adsorbs sulfur oxides.

Since this configuration operates in the above described manner, it is possible to limit an increase in pressure loss while improving both the dust collection performance and the impure gas adsorption performance.

(2) The air cleaner 10 includes the housing 12, the first filter 30, and the second filter 40. The housing 12 has the inlet 16 and the outlet 20. The first filter 30 is provided inside the housing 12 and collects dust contained in air. The second filter 40 is arranged side by side with the first filter 30 in the air flow direction inside the housing 12 and adsorbs sulfur-based gas contained in air.

In this configuration, since the first filter 30 and the second filter 40 are accommodated in the single housing 12, the configuration of the air supply passage 52 other than the air cleaner 10 is simplified.

(3) The nonwoven fabric 34, which constitutes the filtering member 32 of the first filter 30, is electret nonwoven fabric.

With this configuration, since the nonwoven fabric 34 is electrically charged, it is possible to collect finer particles of dust and the like by electrostatic force. This further improves the dust collection performance.

(4) The honeycomb base member 42 of the second filter 40 is formed of aluminum foil. This allows the thickness of the honeycomb base member 42 to be reduced while ensuring the stiffness of the honeycomb base member 42. Therefore, the cross-sectional area of the flow path of the through-holes 44 is increased, which limits an increase in pressure loss.

(5) The first filter 30 is located on the upstream side of the second filter 40. This restrains the second filter 40 from being clogged with dust or the like, and the adsorption performance for impure gas of the second filter 40 will be maintained for an extended period.

<Modifications>

The above-described embodiment may be modified as follows.

The oxidation catalyst 46 may be omitted.

The cross-sectional shape of the through-holes 44, which constitute the honeycomb base member 42 of the second filter 40, may be changed to another shape such as a regular hexagon as necessary.

The honeycomb base member 42 may be made of a metal material other than aluminum. Alternatively, the honeycomb base member 42 may be made of a ceramic material.

The filtering member 32 of the first filter 30 may be formed by nonwoven fabric 34 that has not been subjected to a charging process.

The first filter 30 may be located on the downstream side of the second filter 40. In this case, even if powder of the oxidation catalyst 46 or the powder of the adsorbent 48 falls off the honeycomb base member 42 of the second filter 40, such powder is collected by the first filter 30.

The invention claimed is:

1. An air cleaner for a fuel cell system that is employed in a fuel cell system and arranged in a passage for supplying air to a fuel cell main body, the air cleaner comprising:
   a housing having an inlet and an outlet;
   a first filter, which is arranged inside the housing and collects dust contained in air; and
   a second filter, which is arranged side by side with the first filter in an air flowing direction inside the housing and adsorbs impure gas contained in air, wherein
   the first filter includes a filtering member, which has nonwoven fabric and filter paper adhered to the nonwoven fabric,
   the filter paper is located on a downstream side in the air flowing direction of the nonwoven fabric and has a higher packing density than the nonwoven fabric, and
   the second filter includes
      a base member having a honeycomb structure with a large number of through-holes, and
      adsorbent, which is provided on inner surfaces of the through-holes and adsorbs the impure gas.

2. The air cleaner for a fuel cell system according to claim 1, wherein the nonwoven fabric is electret nonwoven fabric.

3. The air cleaner for a fuel cell system according to claim 1, wherein the second filter includes oxidation catalyst that is supported on the inner surfaces of the through-holes and oxidizes sulfur-based gas contained in air.

4. The air cleaner of claim 3, wherein the first filter is located on the downstream side of the second filter and is configured to collect the absorbent and the oxidation catalyst of the second filter.

5. The air cleaner of claim 1, wherein the first filter is located on the downstream side of the second filter and is configured to collect the absorbent of the second filter.

* * * * *